United States Patent
Plijter-Schuddemat

(10) Patent No.: US 12,402,647 B2
(45) Date of Patent: Sep. 2, 2025

(54) CULINARY TASTE ENHANCER

(71) Applicant: OTERAP HOLDING B.V., Zaamdam (NL)

(72) Inventor: Johanna Plijter-Schuddemat, Elst (NL)

(73) Assignee: OTERAP HOLDING B.V., Zaandam (NL)

( * ) Notice: Subject to any disclaimer, the term of this patent is extended or adjusted under 35 U.S.C. 154(b) by 0 days.

(21) Appl. No.: 18/632,747

(22) Filed: Apr. 11, 2024

(65) Prior Publication Data

US 2024/0260632 A1 Aug. 8, 2024

Related U.S. Application Data

(60) Division of application No. 16/711,838, filed on Dec. 12, 2019, now abandoned, which is a continuation of application No. PCT/EP2018/067584, filed on Jun. 29, 2018.

(30) Foreign Application Priority Data

Jun. 30, 2017 (EP) .................. 17179183

(51) Int. Cl.
| | |
|---|---|
| A23L 27/00 | (2016.01) |
| A23L 5/20 | (2016.01) |
| A23L 19/00 | (2016.01) |
| A23L 27/16 | (2016.01) |
| A23L 29/30 | (2016.01) |
| A23L 31/00 | (2016.01) |

(52) U.S. Cl.
CPC .............. *A23L 27/88* (2016.08); *A23L 5/25* (2016.08); *A23L 19/01* (2016.08); *A23L 19/09* (2016.08); *A23L 27/16* (2016.08); *A23L 29/35* (2016.08); *A23L 31/00* (2016.08); *A23V 2002/00* (2013.01)

(58) Field of Classification Search
CPC . A23L 27/88; A23L 27/16; A23L 5/25; A23L 19/09; A23L 19/01; A23L 29/35
See application file for complete search history.

(56) References Cited

U.S. PATENT DOCUMENTS

| | | | |
|---|---|---|---|
| 6,759,068 B2 | 7/2004 | Zurbriggen | |
| 2002/0071900 A1* | 6/2002 | Blortz | A23L 27/24 |
| | | | 426/52 |
| 2002/0155193 A1* | 10/2002 | Zurbriggen | A23L 27/26 |
| | | | 426/52 |

FOREIGN PATENT DOCUMENTS

| | | |
|---|---|---|
| DE | 32 04 141 A1 | 8/1983 |
| GB | 1 303 807 | 1/1973 |
| JP | 56-18563 A | 2/1981 |
| JP | H 06-327430 | 11/1994 |
| KR | 89-0005256 B1 | 12/1989 |
| RU | 2 569 829 C1 | 11/2015 |
| WO | WO 01/30179 A1 | 5/2001 |
| WO | WO 2016/131122 A1 | 8/2016 |

OTHER PUBLICATIONS

Jobling et al. WO 2016131122 A1. Derwent Abstract.*
WO, PCT/EP2018/067584 ISR and Written Opinion, Aug. 9, 2018.
Danielle, "Making Tomato Powder", retrieved from https://lovelovething.com/how-to-make-tomato-powder/, 2014, 29 pages.
"Garlic Powder" retrieved from www.gnpd.com, May 2017, pp. 1-2.
"Homemade Onion Powder", WNAC, retrieved from https://whoneedsacape.com/2015/homemade-onion-powder, 26 pages.

* cited by examiner

*Primary Examiner* — Stephanie A Cox
(74) *Attorney, Agent, or Firm* — ONE LLP

(57) ABSTRACT

The present invention relates to a vegetable powder, a process for preparing the powder and its use in food products. The vegetable powder may be used to improve a food product, in particular to improve its taste, flavour or texture. An improved food product according to the invention shows one or more of the following improvements in comparison to the food product to which no powder has been added: a rounder flavour profile, less off-notes, a sweeter taste, more umami taste, more kokumi taste or more creaminess. The powder according to the invention allows for clean and clear-labelled food products.

11 Claims, No Drawings

CULINARY TASTE ENHANCER

CROSS-REFERENCE TO RELATED APPLICATIONS

The subject application is a divisional of U.S., application Ser. No. 16/711,838, filed Dec. 12, 2019, which is a continuation of PCT Patent Application No. PCT/EP2018/067584, filed Jun. 29, 2018, which claims priority to European Patent Application No. 17179183.3, filed on Jun. 30, 2017, all of which are incorporated by reference herein in their entireties for all purposes.

FIELD OF THE INVENTION

The present invention relates to a taste enhancer, to a method for making the taste enhancer and to food products improved by the taste enhancer.

BACKGROUND OF THE INVENTION

The taste of food products may be enhanced by adding taste enhancing powders based on vegetables, such as mushrooms and tomatoes. Many of these taste enhancing powders are made by spray drying vegetable parts and residues from processing which are normally discarded on a maltodextrin carrier. The spray dried powders add a bouillon or umami taste to the food products to which they are added. A disadvantage is that the food product to which the powder has been added now contains maltodextrin which needs to be included in the product label, as such or as flavouring. Maltodextrin also may have a negative influence on the product taste and leads to dilution of the vegetable material in the powder.

An alternative way to make taste enhancing powders is freeze-drying. Sliced vegetables or vegetable side streams are freeze-dried and subsequently ground. The freeze-dried powders have an intense vegetable taste, which make them very suitable for enhancing the taste of the original vegetable. However, they cannot be used for general taste enhancement. Therefore, they cannot be used universally. Moreover, in this process, valuable side streams, such as from washing or cooking steps cannot be used.

WO 01/30179 describes flavouring onion and garlic powders prepared from onion or garlic powder, which is hydrolysed for 20 hours, then dried on a maltodextrin carrier and used to introduce or enhance onion and garlic notes in food products. Fermentation of the hydrolysate is required to obtain meaty flavours.

It would be desirable to have a taste enhancer which can be used for umami taste enhancement, which does not have an outspoken specific vegetable taste and which allows for clean and clear labelling.

DETAILED DESCRIPTION OF THE INVENTION

In one aspect, the present invention relates to a vegetable powder comprising at least 90% w/w dry vegetable material, less than 0.01% w/w maltodextrin and a savoury or pan-fried smell or taste. The powder is typically coloured and not hygroscopic.

The powder according to the invention may be used to improve a food product, in particular to improve its taste or flavour, for example by improving its flavour profile or texture experience or by masking off-notes. An improved food product according to the invention shows one or more of the following improvements in comparison to the food product to which no powder has been added: a more balanced flavour profile, less off-notes, a sweeter taste, more umami taste, more creaminess or more kokumi taste. In one embodiment, the powder according to the invention gives food products a better flavour balance e.g. by suppressing sourness peaks in the food product.

An advantage over spray-dried products is that the powder according to the invention has a more intense savoury taste than spray-dried products. Therefore, lower amounts of the powder according to the invention can be used to get a similar effect.

Another advantage is that the powder according to the invention allows for clean and clear labelling of the improved food product containing the powder, because the powder does not need a carrier, such as salt, maltodextrin or starch, for drying. Clean labelling refers to having no or only a few additives on the product label. Clear labelling refers to products with a label with ingredients which are clear to the general customer. Therefore, food products comprising the powder according to the invention may be promoted as products with a clean and clear label. This is in contrast to spray-dried products, which typically comprise a carrier or filler, such as maltodextrin, which need to be included in the product label of the end product.

In contrast to freeze-dried vegetable powders, which have an intense vegetable taste] of the original vegetable, the powder according to the invention can be used to intensify many different tastes. Addition of the powder typically gives a food product a more balanced flavor profile, a savoury or more umami taste, frequently with an improvement on the creaminess. In one embodiment, a mushroom powder according to the invention is used to enhance the creaminess of a mayonnaise, without adding a mushroom taste.

Another advantage is that the powder according to the invention is a dry powder which is stable, i.e., not hygroscopic.

In the context of the present invention, a more balanced taste or flavour profile refers to a taste or flavour profile in which all the taste or flavour components are on a level where they do not stand out (no taste or flavour peaks) compared to the total taste or flavour profile. In one embodiment, a powder according to the invention gives a mayonnaise a more balanced profile by suppressing its sourness.

Taste and flavour are preferably evaluated by a panel of trained panellists. The panel preferably comprises at least five, at least six, at least seven, at least eight, at least nine or at least ten trained panellists. In one embodiment, the panel comprises from 5 to 20, 5 to 15 or 10 to 20 trained panellists. Preferably, descriptive sensory analysis is used for taste and flavor evaluation. In one embodiment, the Quantitative Descriptive Analysis (QDAR) technique is used, which is one of the main descriptive analysis techniques in sensory evaluation. Using the QDAR technique, a panel of 5 to 10 or 5 to 12 panelists will be sufficient for effective sensory evaluation.

In the context of the present invention, sweetness refers to the taste of sugar and may be assessed by a panel of trained panellist on the base flavour sweet. A panel is trained enough on sweet if each panellist at least nine out of ten times tastes the difference between any pair of (i) water, (ii) water with 0.3% w/v sugar and (iii) water of 0.5% w/v sugar.

In the context of the present invention, umami refers to the savoury taste and mouthfeel of monosodium glutamate (MSG), which may also be obtained with 5'ribonucleotides as GMP and IMP. A product with more umami taste typically has more savoury taste. Umami taste may be assessed by a panel of trained panellist on the taste and mouthfeel of umami. A panel is trained enough on umami if each panellist at least nine out of ten times tastes the difference between any pair of (i) water, (ii) water with 0.03% w/v of MSG and (iii) water with 0.05% w/v MSG added.

In the context of the present invention, kokumi refers to the linger longer effect of a taste or flavour. A product with more kokumi taste typically has more richness and heartiness in taste. Kokumi taste may be assessed by a panel of trained panellist on the taste and mouthfeel of kokumi. A panel is trained enough on kokumi if each panellist at least nine out of ten times tastes the difference between any pair of (i) water and (ii) water with 0.01% w/v of Ajirex NH (Kohjin, Tokyo Japan) and (iii) water with 0.025% w/v of Ajirex NH added.

In the context of the present invention, creaminess refers to the taste of fat or cream and the oral sensation of a thick, smooth liquid or semi-liquid. Creaminess may be assessed by a panel of trained panellist.

In the context of the present invention, masking off-notes refers to masking unpleasant or undesirable flavour notes or peaks, in particular sour, fishy and earthy notes. The masking of off-notes may be assessed by a panel of trained panellist. A panel is trained enough on off-notes if each panellist at least nine out of ten times tastes the difference between (i) water and (ii) water with low dosages of base flavours. The term off-notes refers to taste components that are present or present in high amounts without adding to the total flavour profile.

The powder is oven-dried at vacuum pressure and no carriers, in particular no maltodextrin, are added for drying. The powder comprises at least 90% w/w dry vegetable material, less than 0.01% w/w maltodextrin and a savoury or pan-fried smell or taste. The dry vegetable material in the powder constitutes at least 90% w/w, preferably at least 92% w/w, at least 94% w/w or at least 95% w/w, such as from 90% to 100% w/w or 95% to 100% w/w.

In one embodiment, the powder comprises no maltodextrin at all. In another embodiment, the powder comprises at least 90% w/w dry vegetable material, no maltodextrin and has a savoury and pan-fried smell and taste. The pan-fried taste is the effect of the preparation method of the powder and not the result of the production of reaction flavours from sugars and amino acids.

The powder is typically coloured. The colour of the powder depends on the vegetable from which it was originally prepared. The powder may be any colour, for example brown, brownish, grey, greyish, red, reddish, yellow, or yellowish powder. Typically, it is not white. In one embodiment, the powder is a grey, yellowish or red-brown powder, comprising at least 90% w/w dry vegetable material, less than 0.01% w/w maltodextrin and a savoury or pan-fried smell or taste.

The powder is a stable powder, i.e., is not hygroscopic. The powder may be stored for several months, such as for at least twelve or at least eighteen months, as a free flowing powder without the need for stabilizers. The powder may be stored up to two, three or four years. Preferably the powder is stored in a closed packaging at a temperature in the range of 6 to 25 degrees C. In one embodiment, the powder is stored as a free flowing powder for at least 18 months at dry storage in a closed packaging at a temperature in the range of 6 to 25 degrees C., without the need for stabilizers.

In one embodiment, the vegetable powder according to the invention is a powder obtainable by:
(i) providing a paste from a vegetable material;
(ii) heating the vegetable paste in a vacuum oven for 30 to 90 minutes at an oven temperature in the range of 90 to 120 degrees C., with a vacuum of 80 to 150 mbar;
(iii) decreasing the vacuum to 10 to 50 mbar and continue drying to obtain a dried paste with a product temperature in the range of 85 to 95 degrees C.
(iv) removing the dried paste from the oven;
(v) grinding the dried paste into a powder.

If desired, the powder may be ground to certain size specifications. In one embodiment, the powder is ground to pass a 1 mm-mesh sieve.

In the context of the present invention, the dried paste is also referred to as cake. In another embodiment, the vegetable powder according to the invention is a powder obtainable by:
(i) providing a paste from a vegetable material;
(ii) heating the vegetable paste in a vacuum oven for 60 minutes at an oven temperature of 105 degrees C., with a vacuum of 100 mbar;
(iii) decreasing the vacuum to 10 to 20 mbar and continue drying to obtain a cake with a product temperature in the range of 90 to 95 degrees C.;
(iv) removing the cake from the oven;
(v) grinding the cake into a powder, and optionally
(vi) sieving the powder through a screen.

The vegetable used to make the vegetable powder according to the invention may be any plant, in particular plants typically used in food products, including, but not limited to. Alliacea, such as members of *Allium*; Solanaceae, such as members of the genera *Capsicum* and *Solanum*; and edible fungi, in particular members of the genus Tuberaceae or the order Agaricales, such as members of *Agaricus*, Marasmiaceae, Pleurotaceae, for example, *Agaricus bosporis, Agaricus campestris, Allium ampeloprasum, Allium ascalonicum, Allium cepa, Allium schoenoprasum, Allium sativum, Capsicum annuum, Lentinula edodes, Pleurotes ostreatus* or *Solanum lycopersum*. In one embodiment, the vegetable powder is prepared from chives, garlic, green onion, leek, onion, scallion, spring onion, sweet pepper, pepper, tomato or mushrooms, including button mushroom, champignon mushroom, oyster mushroom, Parish mushroom. Portobello mushroom and white mushroom; shiitakes and truffles. In another embodiment, the vegetable powder is prepared from mushrooms, tomatoes or onions.

In one embodiment, the vegetable paste which is fed into the oven is prepared from vegetable material, which includes fresh vegetables, side streams or products from vegetable processing which would normally be discarded, such as blanching water, stems and leaves. The vegetable material may be turned into a paste by cooking and evaporation of the vegetables, side streams or products from vegetable processing. In another embodiment, the vegetable paste is obtained commercially, for example from Scelta, Venlo, the Netherlands; Lutece, Velden, the Netherlands; Top Flavours, 's-Gravenpolder, the Netherlands; HIT, Castanheira do Ribatejo; or ProChamp, Velddriel, the Netherlands.

The powder according to the invention is prepared by oven-drying a vegetable paste. In one embodiment, the paste which is fed into the oven has a dry matter content of at least 50% w/w, preferably, the paste has a dry matter content of at least 55% w/w, at least 60% w/w, at least 65%, at least 70% w/w or at least 75% w/w, up to 80% w/w, for example a dry matter content between 55% w/w and 80% w/w, between 55% w/w and 70% w/w or between 55% and 65% w/w.

The dry matter content of the paste may be determined by any method known in the art and typically comprises removing all or at least 98%, at least 99%, of the moisture in a sample of the paste by evaporation of water, for example by drying a representative sample of the paste in an oven or in a dehydrator. In one embodiment, the dry matter content of the paste is determined by measuring the weight of a representative sample before and after drying in an oven. Drying may take from several minutes to several hours, for example from 10 minutes to six hours, depending on the drying temperature and the nature, moisture content and size of the sample. In one embodiment, the drying takes at least 10 minutes, at least 30 minutes, at least 60 minutes, at least two hours, at least three or at least four hours. Preferably, it is not dried for more than six hours, not more than four hours or not more than five hours. In another embodiment, the dry matter content of the paste is determined by measuring the weight of a representative sample of the paste before and after drying for 4 hours at 105 degrees C. Pumice may be used in the process. The sample which is used for determining the dry matter content should be a representative sample of certain size. In one embodiment, 1 to 5 grams, for example 1, 2 or 3 grams, of the paste is used for determining dry matter content of the paste.

Before being dried in the oven, the paste may optionally be pre-treated in several ways. In one embodiment, before being dried in the oven, the paste is pre-treated to keep the product from darkening during the cooking process or during storage of the end product. Preferably only natural treatments are used, for example using natural acids. In one embodiment, citric acid is used to this end. Acids may be used in a concentration of 0.5% w/w to 5% w/w, preferably in a concentration of 1% w/w to 3% w/w. In one embodiment, 2% w/w citric acid is used to prevent darkening of the powder and of the product in which the powder is used.

Processing means may be added to the vegetable paste before it is dried in the oven. In one embodiment, 0.001% w/w to 5% w/w, preferably 0.001% w/w to 1% w/w, of an anti-foaming agent is added to the vegetable paste. In another embodiment 0.1% w/w to 10% w/w of an anti-foaming agent is added to the paste. Suitable anti-foaming agents include insoluble oils, mono and diglyceride esters, certain alcohols, stearates and glycols. Oil may also be added to the vegetable paste to optimize the process and powder characteristics, preferably a vegetable oil is used, such as almond oil, castor oil, coconut oil, linseed oil, olive oil, palm oil, peanut oil, rapeseed oil, rice oil, soybean oil or sunflower oil. The oil is preferably used in an amount of 0.01% w/w to 10% w/w, preferably in an amount of 0.05% w/w to 5% w/w, more preferably 0.05% w/w to 1.5% w/w.

In one embodiment, before being dried in the oven, the vegetable paste is pre-treated with one or more enzyme compositions, preferably comprising cell wall degrading enzymes, including cellulose degrading enzymes, beta-glucan degrading enzymes and xylan degrading enzymes. In the present context, the cellulose degrading enzyme preferably completely or partly hydrolyzes beta-1,4-glucan or beta-D-glycosidic linkages, for example those in cellulose or carboxymethylcellulose (CMC). The xylan degrading enzyme preferably completely or partly hydrolyzes one or more of xylan, glucuronoxylan, arabinoxylan, glucomannan and xyloglucan. The beta-glucan degrading enzymes preferably completely or partly hydrolyzes one or more of beta-1,3-glucans, beta-1,4-glucans, beta-1,6 glucans, in particular beta-D-glycosidic linkages, including branched forms of these beta-glucans. Suitable enzymes to this end include but are not limited to cellulases (EC 3.2.1.4), endo-xylanases (EC 3.2.1.8) and beta-glucanases (EC 3.2.1.6). The enzyme composition may comprise one or more of these enzymes.

The enzyme may be the main activity in the composition or a side or minor activity in the composition. In one embodiment, the enzyme composition comprises 0.1-100% w/w of cell wall degrading enzyme, based on the total amount of the enzyme composition. In one embodiment, the vegetable paste is treated with 0.1% w/w to 1% xylan degrading enzyme, 0.1 w/w to 1% w/w cellulose degrading enzyme or 0.1% w/w to 1% w/w beta-glucan degrading enzyme, based on the total weight of the vegetable paste. In one embodiment, 0.5% w/w to 1% w/w of cell wall degrading enzymes are used to treat the vegetable paste.

In one embodiment, an enzyme composition is used with an activity towards xylan, cellulose or beta-glucan of 50,000-200,000 units/g. One unit is the amount of enzyme which liberates one micromole of substrate at 25-40 degrees C., and pH 4.5 to 5.5, depending on the enzyme. In one embodiment, the vegetable paste is treated with one or more enzyme compositions comprising one or more of 0.1% w/w to 1% of 90,000 u/g xylanase activity, 0.1 w/w to 1% w/w of 40,000 u/g cellulose activity or 0.1% w/w to 1% w/w of 5,000 u/g beta-glucanase activity. In another embodiment, the vegetable paste is treated with one or more enzyme compositions comprising equal amounts of several enzymes.

Although the enzymes in the enzyme composition may be obtained by isolation from any source, such as from a plant, fungus, bacterium, or completely or partly by de nova synthesis, they are preferably derived from a fungus.

The paste is incubated with the enzyme composition for maximally two hours, such as for 10 to 120 minutes, 30 to 90 minutes or 45 to 70 minutes, depending on the activity of the enzyme composition. The incubation temperature depends on the enzyme or enzyme mixture used. In one embodiment, the incubation temperature is in the range of 40 to 55 degrees C. In another embodiment, the incubation temperature is in the range of 48 to 52 degrees. The pH during incubation depends on the enzyme composition used. In one embodiment, the pH is about 5.0, for example in the range from pH 4.5 to pH 5.5.

In one embodiment, the vegetable powder is obtained without any pre-treatment of the paste. In another embodiment, the vegetable powder is obtained from a paste which has been pre-treated with a natural acid to prevent browning and which has been subjected to hydrolysis.

After an optional pre-treatment, the vegetable paste is dried in the oven by heating the paste in the oven for 30 to 90 minutes, for example for 50 to 80 minutes or 55 to 70 minutes, at a temperature in the range of 90 to 120 degrees C., for example in the range of 95 to 110 degrees C., with a vacuum in the range of 80 to 150 mbar, for example in the range of 90 to 105 mbar. Next, the vacuum is reduced to 10 to 50 mbar, for example to 10 to 20 mbar and the product is allowed to dry further until a cake temperature in the range of 85 to 95 degrees C., for example until a temperature in the range of 90 to 95 degrees C., is reached. Usually, this takes from about 2 to 5 hours, such as 3 to 5 hours. Paste or cake temperature may be measured in any suitable way. In one embodiment, product temperature is measured by a Jumo Wtrans sender and receiver type blad 90.2930.

The paste may be heated in the oven while placed on a tray. The tray may be of any suitable heat-resistant material, such as a polypropylene or iron. Heat-resistant in this context means that the material does not burn or melt within the range of operating temperatures of the present invention. In one embodiment, a tray from Kunstoffabriek, Coevorden, the Netherlands or H-S automotive of 100×48×7 cm was used for 3 kg paste.

The oven used for drying the paste may be any suitable oven, preferably a vacuum oven, most preferably with vacuum control. In one embodiment, a Binder Oven type VD115 with a Vacuubrand pump PC 3004 is used. Atmospheric pressure is 1000 mbar, vacuum operation is typically at a pressure lower than 1000 mbar, for example at a pressure in the range of 5 to 400 mbar, in the range of 5 to 200 mbar, in the range of 80 to 150 mbar, in the range of 10 to 100 mbar or in the range of 10 to 50 mbar, such as at 100 mbar, at 80 mbar, at 60 mbar, at 40 mbar, at 20 mbar or at 10 mbar.

Then the dried paste, now a cake, is removed from the oven and ground into a powder. Grinding of the cake may be performed by any suitable means. In one embodiment, it is performed using a KitchenAid Artisan 5ksb555ebuo grinding machine. In another embodiment, a hammer mill or a hammer in combination with a cross beater mill (e.g. Hosakawa, Peppink, Netsch) is used. In this way a free-flowing powder is obtained which may be used to improve a food product. The dry matter content of the powder is at least 95% w/w, preferably 96 to 98% w/w or 96 to 100%. The dry matter content of the powder may be determined by any method known in the art. In one embodiment, dry matter content is determined by measuring the weight of a representative sample before and after drying in an oven.

No powder stabilisation is required. The powder is a stable powder, i.e., is not hygroscopic. The powder may be stored for several months, such as for at least twelve or at least eighteen months, as a free flowing powder without the need for stabilizers. The powder may be stored up to two, up to three or up to four years. Preferably the powder is stored in a closed packaging at a temperature in the range of 6 to 25 degrees C. In one embodiment, the powder is stored for at least 18 months at dry storage in a closed packaging, at a temperature in the range of 6 to 25 degrees C., as a free flowing powder without the need for stabilizers. The powder obtained may optionally be ground to prepare a powder with particles of certain size. In one embodiment, the powder is ground to pass a 1 mm-mesh sieve.

In one embodiment, a powder of the invention is a vegetable powder comprising at least 90% w/w dry vegetable material, no maltodextrin and having a savoury or pan-fried smell or taste, wherein the powder is obtainable by
(i) providing a paste from a vegetable material;
(ii) heating the vegetable paste in a vacuum oven for 60 minutes at an oven temperature of 105 degrees C., with a vacuum of 100 mbar;
(iii) decreasing the vacuum to 20 mbar and continue drying to obtain a dried cake with a cake temperature in the range of 90 to 95 degrees C.;
(iv) removing the cake from the oven;
(v) grinding the cake to obtain a powder.

In another embodiment, a powder of the invention is a vegetable powder comprising at least 90% w/w dry vegetable material, less than 0.01% w/w maltodextrin and having a savoury or pan-fried smell or taste, wherein the powder is stable and obtained by
(i) providing a tomato, mushroom or onion paste with a dry matter content in the range of 50% to 80% w/w;
(ii) heating the vegetable paste in a vacuum oven for 30 to 90 minutes at an oven temperature of 90 to 120 degrees C., with a vacuum in the range of 80 to 150 mbar;
(iii) decreasing the vacuum to 10 to 50 mbar and continue drying to obtain a dried cake with a cake temperature in the range of 85 to 95 degrees C.;
(iv) removing the cake from the oven;
(v) grinding the cake to obtain a powder, wherein the tomato, mushroom or onion paste is treated for maximally two hours, at pH in the range of pH 4.5 to 5.5, at a temperature in the range of 48 to 52 degrees C., with an enzyme composition comprising cellulose degrading enzyme, xylanase degrading enzyme or beta-glucan degrading enzyme before it is dried in the oven in step (ii).

In another aspect, the present invention relates to a process for preparing a vegetable powder, the process comprising:
(i) providing a paste from a vegetable material;
(ii) heating the vegetable paste in a vacuum oven for 30 to 90 minutes at an oven temperature a temperature in the range of 90 to 120 degrees C., with a vacuum in the range of 80 to 150 mbar;
(iii) decreasing the vacuum to 10 to 50 mbar and continue drying to obtain a cake with a product temperature a temperature in the range of 85 to 95 degrees C.;
(iv) removing the cake from the oven;
(v) grinding the cake into a powder, and optionally
(vi) sieving the powder to obtain a certain size distribution.

The powder is oven-dried at vacuum pressure and no carriers, in particular no maltodextrin, are added for drying. The process according to the invention yields a vegetable powder according to the invention which comprises at least 90% w/w dry vegetable material, less than 0.01% w/w maltodextrin and a savoury or pan-fried smell or taste. The powder is typically coloured, free-flowing and not hygroscopic. No carrier, such as salt, maltodextrin or starch, is added. The embodiments and preferred embodiments described in the previous aspect are also applicable to the process.

Thus, the vegetable used to make the vegetable powder according to the invention may be any plant, in particular a plant typically used in food products, such as members of the genera *Allium Capsicum* and *Solanum*; and edible fungi. The vegetable paste which is fed into the oven may be prepared from vegetable material or may be obtained commercially. The dry mater content of the paste which is fed into the oven is at least 50% w/w, up to 80% w/w and may for example be determined by measuring the weight of a representative sample before and after drying in an oven. Before being heated in the oven for drying, the paste may optionally be pre-treated in several ways to positively influence the drying process or end product, such as by acid treatment to prevent darkening, anti-foaming to reduce foaming or enzyme hydrolysis to promote drying. For hydrolysis, the vegetable paste may be treated with one or more enzyme compositions, preferably comprising cell wall degrading enzymes, including cellulose degrading enzymes, beta-glucan degrading enzymes and xylan degrading enzymes for maximally two hours, such as for 10 to 120 minutes, 30 to 90 minutes or 45 to 70 minutes, depending on the activity of the enzyme composition, at a pH of about 5.0, for example in the range of pH 4.5 to 5.5, at a temperature in the range of 40-55 degrees. In one embodiment, tomato, mushroom or onion paste is hydrolysed with cell wall degrading enzymes for maximally two hours, at a pH in the range of pH 4.5 to 5.5, at a temperature in the range of 48 to 52 degrees C., before being dried in the vacuum oven in step (ii).

In one embodiment, a process of the invention is a process for preparing a vegetable powder comprising at least 90% w/w dry vegetable material, less than 0.01% w/w maltodextrin and having a savoury or pan-fried smell or taste, the process comprising:
- (i) providing a paste from chives, garlic, leek, onion, sweet pepper, pepper, tomato, mushrooms or truffles, preferably mushrooms, onions or tomatoes, and optionally treating the paste for maximally two hours, at a pH in the range of pH 4.5 to 5.5, at a temperature in the range of 48 to 52 degrees C., with an enzyme composition comprising cellulose degrading enzyme, xylanase degrading enzyme or beta-glucan degrading enzyme;
- (ii) heating the vegetable paste in a vacuum oven for 30 to 90 minutes at an oven temperature in the range of 90 to 120 degrees C., with a vacuum in the range of 80 to 150 mbar;
- (iii) decreasing the vacuum to a vacuum in the range of 10 to 50 mbar and continue drying to obtain a dried cake with a cake temperature in the range of 85 to 95 degrees C.;
- (iv) removing the cake from the oven;
- (v) grinding the cake to obtain a powder.

In yet another embodiment, a process of the invention is a process for preparing a vegetable powder comprising at least 90% w/w dry vegetable material, less than 0.01% w/w maltodextrin and having a savoury or pan-fried smell or taste, the process comprising:
- (i) providing a paste from tomato, mushroom or onion;
- (ii) treating the paste for 90 to 120 minutes, at a pH in the range of pH 4.5 to 5.5, at a temperature in the range of 48 to 52 degrees C., with an enzyme composition comprising cellulose degrading enzyme, xylanase degrading enzyme or beta-glucan degrading enzyme;
- (iii) heating the vegetable paste in a vacuum oven for 60 minutes at an oven temperature of 105 degrees C., with a vacuum of 100 mbar;
- (iv) decreasing the vacuum to 20 mbar and continue drying to obtain a dried cake with a cake temperature in the range of 90 to 95 degrees C.;
- (v) removing the cake from the oven;
- (vi) grinding the cake to obtain a powder.

In another aspect, the present invention relates to the use of a powder according to the invention, as described above in the previous aspects, in a process for preparing an improved food product. The process comprises adding a vegetable powder according to the invention to a food product. The food product may be any food product for which it is desired to improve taste, flavour or texture experience, such as fresh and dry food products. Suitable examples include sauces, soups, stocks, instant noodles, ready meals, salad dressings, toppings, savoury baked goods, meat, savoury snacks. In one embodiment a mayonnaise is improved by adding a powder according to the invention.

The vegetable powder is preferably added in an amount of between 0.01% w/w and 5% w/w, between 0.05% w/w and 1% w/w or between 0.1% w/w and 0.8% w/w, based on the weight of the food product before the vegetable powder is added. In this way an improved food product according to the invention is obtained. This improved food product comprising a vegetable powder according to the invention is also encompassed by the present invention.

An improved food product according to the invention shows one or more of the following improvements in comparison to the food product to which no powder has been added: a more balanced flavour profile, less off-notes, a sweeter taste, a more savoury taste, more umami taste and mouthfeel, more kokumi taste or more creaminess. This effect may be achieved without introducing the taste of the original vegetable material in the end product. If the taste of the original vegetable material is desired in the end product, the powder according to the invention may be dosed to get this additional taste effect, without losing the other improvements. In one embodiment, a mushroom powder according to the invention gives mayonnaise a more balanced flavour profile and more creaminess, without giving a mushroom taste. In another embodiment, an onion powder according to the invention gives beef bouillon a more balanced flavour profile and more umami and meaty taste, without a perceivable onion taste. Under similar conditions, a maltodextrin spray-dried powder, gives a strong pungent onion taste and smell.

EXAMPLES

Example 1 Preparing a Mushroom Powder According to the Invention

Mushroom paste was obtained from Scelta Mushrooms BV (Venlo, The Netherlands, Mushroom Concentrate centrifuged—M 60). This mushroom paste had a dry matter of 58%. The paste was blended with 2% on dry matter of citric acid (citric acid androhydrous, Jungbunzlauer Austria AG, Vienna Austria). The mixture was evaporated in a rota vapor film evaporator with a product temperature of 62 degrees Celsius. until a dry matter of 75% was reached, 200 gram paste was poured on a tray with a surface area of 143 cm$^2$.

The paste was dried in a preheated oven (Binder Oven type VD115 with a Vacuubrand pump PC 3004) at 105 degrees Celsius. on a vacuum of 100 mbar. After one hour the vacuum was lowered to 10 mbar. After three hours at 10 mbar the cake reached a temperature of 92 degrees Celsius. and the oven vacuum was turned off. The dried paste, also referred to as cake, was removed from the oven and allowed to cool until room temperature. Next the cake was ground using a hammer mill (KitchenAid Artisan 5ksb555ebuo. KitchenAid, Gouda, the Netherlands) to pass a 1 mm-mesh sieve which resulted in the powder.

Example 2 Effect of Mushroom Powder According the Invention on Zaanse Mayonnaise The mushroom powder was solved at 0.3% w/w dosage in full fat Zaanse mayonnaise (Van Wijngaarden, Wormerveer, the Netherlands). A QDAR expert panel (seven members) compared the taste of the prepared product with the taste of full fat Zaanse mayonnaise (control). The mushroom powder gave an enhanced taste intensity, aftertaste, sweetness and creaminess of the mayonnaise. The mayonnaise had a more sweet, more kokumi and more umami taste with an improvement on the creaminess and a better flavour balance by suppressing the sourness.

Example 3 Preparing a Tomato Powder According to the Invention

A cold-break quality tomato paste with a dry matter content of 65% w/w was incubated with 0.33% (w/w) of the Enzyme TAIL31 Viscosity reduction, 0.33% (w/w) of the Enzyme 26 Betaglucanase and 0.33% (w/w) of the Enzyme TAIL54 Xylanase/Betaglucanase (Tailorzyme, Stiborg. Denmark) at pH 5.2 for two hours at 50 degrees C., while being stirred. Next, 200 g of paste was poured on a tray with a surface area of 143 cm$^2$ and dried in a preheated oven at 105 degrees C., with a vacuum of 100 mbar for 60 min. Then, the vacuum was reduced till 20 mbar and the product was dried till a product temperature of 94 degrees C. at 20 mbar, the dried paste was removed from the oven and allowed to cool to room temperature. Next, the cake was ground into a powder.

Example 4 Preparing Another Tomato Powder According to the Invention

A cold-break quality tomato paste with a dry matter content of 65% w/w was incubated with 0.5% w/w of a 1:1 mixture of Cellulase A Amano 3 and Hemicellulase Amano 90 (Amano Enzyme Europe, Oxfordshire. United Kingdom) at pH 5.2 for two hours at 50 degrees C., while being stirred. Next, 200 g of paste was poured on a tray with a surface area of 143 $cm^2$ and dried in a preheated oven at 105 degrees C., with a vacuum of 100 mbar for 60 min. Then, the vacuum was reduced till 20 mbar and the product was dried till a product temperature of 92 degrees C., at 20 mbar, the dried paste was removed from the oven and allowed to cool to room temperature. Next, the dried paste was ground which resulted in the powdered end product.

Example 5 Effect of Tomato Powder According the Invention on Zaanse Mayonnaise

The tomato powder of Example 3 was solved at a 0.3% w/w dosage in full fat Zaanse mayonnaise (van Wijngaarden, Wormerveer, Netherlands). A QDA® expert panel (seven members) compared the taste of the prepared product with the taste of full fat Zaanse mayonnaise (control). The tomato powder gave the mayonnaise a fuller, sweeter and more kokumi and umami taste with an improvement on the creaminess and a better flavour balance by suppressing the sourness. The tomato powder also gave a slightly tomato acidity. It gave an intense taste and a hint of spices, caramel and ketchup or tomato.

Example 6 Preparing an Onion Powder According to the Invention

The onion paste (Top onions, Top Flavours, 's-Gravenpolder, Netherlands) was treated with 0.33% (w/w) of the 'Enzyme TAIL31 Viscosity reduction', '0.33% (w/w) of the 'Enzyme 26 Betaglucanase' and 0.33% (w/w) of the Enzyme TAIL54 Xylanase/Betaglucanase (Tailorzyme, Söborg, Denmark) at pH 5.2 at 52 degrees C., for one hour. After the enzymatic reaction, 200 g of paste was poured on a tray of 143 $cm^2$ and dried in a preheated oven at 105 degrees C., with a vacuum of 100 mbar for 60 min. Next, the vacuum was reduced till 20 mbar and the product was allowed to dry into a cake until the cake had reached a temperature of 94 degrees at 20 mbar. The cake was removed from the oven and allowed to cool to room temperature. Next, the cake was ground which resulted in a powder according to the invention.

Example 7 Effect of Onion Powder According to the Invention on Zaanse Mayonnaise The onion powder prepared in Example 6 was solved at a 0.3% w/w dosage in full fat Zaanse mayonnaise (Wijngaarden, Wormerveer. Netherland). A QDA® expert panel (seven members) compared the taste of the prepared product with the taste of full fat Zaanse mayonnaise (control). The onion powder gave the mayonnaise a fuller, sweeter and more umami and more kokumi taste with an improvement on the creaminess and a better flavour balance by suppressing the sourness. The onion powder also gave a clear onion flavour. Panel members appreciated the taste, and it had a slight deep fried or pan fried onion taste with a long and sweet after taste. If the onion flavour is not desired, it may be blended in at a lower dosage, i.e. lower than 0.3% w/w. It will give the same effect without the onion taste.

Example 8 Effect of Onion Powder According to the Invention on Clean Label Instant Beef Bouillon The onion powder prepared in example 6 (sample A) was compared to a commercial spray-dried onion juice powder (sample B). The spray-dried powder was produced by spray-drying the juice of onions with about 50% carrier of maltodextrin. Both powders were dosed on 0.1% w/w in clean label instant beef bouillon. A QDA® expert panel (six members) evaluated the effect of the powders on clean label instant beef bouillon (Table 1).

The onion powder according to the invention was found most pleasant, more balanced and more umami, stronger in salty taste, less bitter and more meaty than the clean label instant beef bouillon. Sample B was described as strong pungent onion taste and smell, slight enhancement of herbal notes, no difference on umami and saltiness perceived in comparison to the clean label instant beef bouillon.

The powder according to the invention had a higher overall taste enhancement compared to commercial spray dried powder and was able to give a more balanced, more umami and more meaty taste without introducing an onion taste.

TABLE 1

Effect of onion powder on beef bouillon

| Sample | Product | g/100 g beef bouillon solution | Effect on instant beef bouillon solution |
| --- | --- | --- | --- |
| A | Onion powder according to the invention. | 0.1 | Pleasant balanced product, more umami, stronger in salty taste, less bitter, slight enhancement of herbal notes, more meaty. |
| B | Spray dried onion juice powder with 50% maltodextrin. | 0.1 | Strong pungent onion taste and smell, slight enhancement of herbal notes, no difference on umami and saltiness perceived. |

Example 9 Mushroom Powder According to the Invention Compared to Alternatively Produced Products A QDA® expert panel (six members) compared the mushroom powder according to the invention with three products which have their commercial equivalents, all solved in Zaanse Fritessaus (Van Wijngaarden, Wormerveer, the Netherlands):
- B) Mushroom juice powder produced by spray-drying the juice of mushrooms with about 60% carrier of maltodextrin solved at dosage of 0.9% w/w in Zaanse Fritessaus
- C) Mushroom paste with a dry matter of about 60% which is used to make product A, 0.7% w/w solved in Zaanse Fritessaus
- D) Mushroom powder produced by spray-drying with a carrier of maltodextrin about 50% solved at 0.8% w/w in Zaanse Fritessaus All powders were dosed on 0.4% dry matter mushroom material.

The mushroom powder according to the invention was found most pleasant, less sour, more balanced, pan-fried, creamy and fatty and has a higher taste enhancement. Sample (D) was described as sweeter, slightly sourer, creamier and a little starchy. Sample (B) was described as unpleasant, starchy, and strong in off note. The off note was described as mushroom or yeast extract. Sample (C) was described as having the least impact, making the Zaanse Fritessaus a little less sour, extra creamy and fatty but having a musty taste.

The powder according to the invention was least sour, most balanced, creamiest, and highest taste enhancement of all tested powders although it was used in the lowest amount of all powders tested. This shows that less powder according to the invention is required to get a positive effect.

TABLE 2

Effect of mushroom powder on Zaanse Fritessaus

| Sample | Product | g/100 gram Zaanse Fritessaus | Effect on Zaanse Fritessaus |
|---|---|---|---|
| A | Mushroom powder according to the invention | 0.4 | Pleasant, less sour, more balanced, roasted, creamy and fatty and more umami and more kokum |
| B | Spray-dried mushroom juice powder | 0.9 | Unpleasant, starchy, strong in mushroom, and yeast extract off note |
| C | Mushroom paste | 0.7 | Slightly less sour, extra creamy and fatty but having a musty taste |
| D | Spray-dried mushroom powder | 0.8 | Sweeter, slightly sour, creamier and a little starchy |

The invention claimed is:

1. A process for preparing a vegetable powder, comprising the steps of:
   (i) providing a paste from a vegetable material, wherein the paste has a dry matter content of at least 50% w/w;
   (ii) heating the paste in a vacuum oven for 30 to 90 minutes without a carrier at an oven temperature of 90 to 120 degrees C. with a vacuum of 80 to 150 mbar;
   (iii) changing the vacuum to 10-50 mbar and continue drying the paste to obtain a cake with a cake temperature of 85 to 95 degrees C.;
   (iv) removing the cake from the vacuum oven
   (v) grinding the cake to obtain the vegetable powder.

2. The process of claim 1, wherein the paste is prepared from a vegetable side stream or products from vegetable processing that would otherwise be discarded.

3. The process of claim 1, wherein the paste is subjected to hydrolysis with cell wall degrading enzymes for maximally two hours at a temperature in the range of 40-55 degrees C. at a pH in the range from pH 4.5 to pH 5.5 before heating in step (ii).

4. The process of claim 1, further comprising the step of treating the paste with an enzyme before heating in step (ii).

5. The process of claim 4, wherein the enzyme is selected from the group consisting of a cellulose-degrading enzyme, a xylanase-degrading enzyme, and a beta-glucan-degrading enzyme.

6. The process of claim 1, wherein the vegetable material comprises a plant in a genus selected from the group consisting of *Allium*, *Capsicum*, and *Solanum*.

7. The process of claim 1, wherein the vegetable material comprises a fungus selected from the group consisting of Tuberaceae, Marasmiaceae, and Pleurotaceae.

8. The process of claim 1, wherein the vegetable material is a member of the genus *Agaricus*.

9. The process of claim 1, wherein the vegetable material comprises a vegetable selected from the group consisting of chives, garlic, leek, onion, sweet pepper, pepper, tomato, mushrooms, truffles, onions, and tomatoes.

10. The process of claim 1, wherein the vegetable material is selected from the group consisting of *Agaricus bosporis*, *Agaricus campestris*, *Allium ampeloprasum*, *Allium ascalonicum*, *Allium cepa*, *Allium schoenoprasum*, *Allium sativum*, *Capsicum annuum*, *Lentinula edodes*, *Pleurotes ostreatus* or *Solanum lycopersum*.

11. The process of claim 1, wherein the vegetable powder comprises at least 90% w/w dry vegetable material and less than 0.01% w/w of a carrier.

\* \* \* \* \*